United States Patent [19]

Karasawa et al.

[11] 4,386,287
[45] May 31, 1983

[54] SYNCHRONOUS MOTOR FOR TIMEPIECE

[75] Inventors: Setsuyuki Karasawa, Tokyo; Minosaku Aso, Showa; Yoshinori Goto, Ohmiya; Akira Nikaido, Tokorozawa, all of Japan

[73] Assignees: Rhythm Watch Co., Ltd.; Citizen Watch Co., Ltd., both of Tokyo, Japan

[21] Appl. No.: 236,910

[22] Filed: Feb. 23, 1981

Related U.S. Application Data

[63] Continuation of Ser. No. 74,487, Sep. 11, 1979, abandoned.

[30] Foreign Application Priority Data

Sep. 20, 1978 [JP] Japan .................. 53/115438

[51] Int. Cl.³ .......................................... H02K 21/18
[52] U.S. Cl. .................... 310/49 R; 310/156; 310/162
[58] Field of Search ............. 310/40 R, 40 MM, 156, 310/162, 163, 40, 49 R; 318/129, 130

[56] References Cited

U.S. PATENT DOCUMENTS

| 1,788,813 | 1/1931 | Toewe .................. 310/163 |
| 4,088,909 | 5/1978 | Matsumura et al. .... 310/49 R |
| 4,214,181 | 7/1980 | Nagahori ............... 310/162 |

Primary Examiner—William M. Shoop
Assistant Examiner—D. L. Rebsch
Attorney, Agent, or Firm—Koda and Androlia

[57] ABSTRACT

A synchronous motor for a timepiece capable of cancelling unbalance in self-starting driving power with regard to the oscillating direction at the time of self-starting, in which adjoining stator pole pitch angles are set at 0.5 times or 1.5 times the rotor pole pitch angle. Provision of specific directional performance is restricted to direction of self-starting rotation. The air gap between the stator supplementary poles and the rotor is set at a ratio between 1 and 1.4 against the air gap between the stator main poles and the rotor; width of the stator supplementary poles is wider than the stator main poles.

4 Claims, 6 Drawing Figures

SYNCHRONOUS MOTOR FOR TIMEPIECE

This is a continuation of application Ser. No. 074,487, filed Sept. 11, 1979, now abandoned.

BACKGROUND OF THE INVENTION

1. Field of Invention

This invention relates to a synchronous motor for a timepiece and in particular to a synchronous motor for a timepiece which converts an alternating electric signal from a time signal generating means to mechanical movement of constant speed rotation.

2. Description of the Prior Art

In order to convert time generating signals of pulses, etc. supplied by an AC commercial power source, crystal oscillator, or other oscillating means with highly accurate frequency to mechanical rotation of time indicating hands; various synchronous motors for timepieces find wide utility in accurate analog type display timepieces. For this type of synchronous motor, small electric power consumption and reliable self-starting properties are demanded. The conventional synchronous motor, however, could not completely meet the demand of these requirements.

In FIG. 1, shown therein is a conventional synchronous motor, which is composed of a rotor 10, stator plates 12 and 14, and an energizing coil 16. The rotor 10 has two rotor poles which are shown as N and S poles magnetized in opposite positions at 180 degrees from each other in the Figure. On the other hand, the stator plates 12 and 14 have a pair of stator poles on each stator plate, 12a and 12b, or 14a and 14b, arranged at 90 degrees respectively, and the stator poles of 12a and 14a, and 12b and 14b are arranged across from each other against the center of the rotor 10. At the common stem of the stator plates 12 and 14 the energizing coil 16 is windingly arranged to be supplied an alternating electric signal from a time signal generating means and alternating magnetic flux is provided to the stator composed of the respective stator plates of 12 and 14. This alternating magnetic flux generates oscillating movement in the form of electro-magnetic attractive and repelling forces over the rotor 10. When the oscillating movement grows gradually to exceed a specific oscillating angle, the rotor 10 starts the movement at a constant speed rotation synchronized with the input alternating electric signal. The value of the constant speed rotation is determined by the number of rotor and stator poles and the frequency of the alternating electric signal, and movement of mechanical rotation with high accuracy is provided depending on the accuracy of the alternating electric signal supplied to the energizing coil 16 when the rotor 10 is connected and arranged to the well-known time indicating gear train, which makes it possible to provide a analog type display timepiece with time indicating hands operated by the time indicating gear train.

The prior art device in FIG. 1, however, has such drawbacks that the existance of an unbalanced state in the driving power of self-starting deteriorates the self-starting power properties and results in the loss of efficiency of the motor, since the rotor 10 has two static central positions which are basically located against the dynamic magnetic center line of the stator. The static central position of the rotor shows the standstill position of the rotor 10 by the line connecting the facing rotor poles in such state that the signal is not supplied to the energizing coil and that no alternating magnet flux is produced to the respective stator plates 12 and 14. In FIG. 1, it is shown as the location that two rotor poles N and S coincide with the line connecting the opposite stator poles either 12a and 14a or 12b and 14b, that is, it is shown by the straight line A or B. In another words, in the static central position A or B, the rotor poles are attracted by the stator poles and the rotor is caused to stand still. In the prior art device, it is not defined which of the static central position A or B the rotor 10 takes, but either static central position can be selected with same probability resulting in standstill.

On the other hand, the dynamic magnetic center line, that is, the strongest position of the electro-magnet coupling between the stator and the rotor at the state that the coil 16 is excited and the alternating magnetic flux is supplied to the stator, is shown by a line C in the FIG. 1.

Each static central position A or B and the dynamic magnetic center line C are not geometrically crossed with the dynamic magnetic center line at right angles to produce an unbalanced state in driving power at the time of self-starting. Taking the example of the static central position B, it is well-understood to produce such remarkably unbalanced state in the driving power that there exists an offset angle of 45 degrees clockwise or 135 degrees counter-clockwise against the dynamic magnetic center line C, which makes a massive difference in the strength of initial oscillating movement towards a certain rotating direction in starting the rotor and results in the loss of growing speed in the oscillating movement.

Also in the prior art device, the number of rotor poles is set at two, and large initial oscillation exceeding the amplitude of 90 degrees is at least required by the time the rotation reaches the synchronized constant speed, which results in drawbacks in self-starting properties.

Furthermore, a reverse rotation preventive mechanism must be always attached to the prior art device since the static central position of the rotor 10 is at two places and the self-starting direction is not defined.

SUMMARY OF THE INVENTION

Accordingly, it is the general object of the present invention to provide a synchronous motor for timepieces having excellent self-starting properties and an improved motor efficiency, and it is another object of the present invention to provide a synchronous motor for timepiece in which the self-starting direction of the rotor can be restricted to a specific direction.

In keeping with the principles of the present invention, the objects are accomplished with a unique synchronous motor for timepieces in which the unbalanced state is eliminated in the self-starting driving power with regard to the oscillating direction at the time of self-starting by means of the setting of rotor pole numbers in the formula of $2(2n+1)$ and stator pole numbers at $2(2n+1)+2$, provided that n is the positive integer, the arrangement of the stator poles of each stator plate at non-equal distance angle, and the location of the static central position of the rotor at the substantial center of the dynamic magnetic center of the stator.

In the present invention, it is preferable that the adjacent stator pole pitch angle is settled at 0.5 or 1.5 times of the rotor pole pitch angle.

In the present invention, it is possible to provide a specific directional performance to the self-starting rotation of the rotor by means of setting the stator poles of main poles and supplementary poles having different magnetic coupling power from the stator.

In the present invention, the magnetic coupling power of the stator main poles and the stator supplementary poles against the rotor pole is adjusted by the change of the air gap between main and supplementary poles and the rotor, and, in particular, it is preferable that the air gap between the stator supplementary poles and the rotor is set at a range of bigger than 1 and smaller than 1.4 against the air gap between the stator main poles and the rotor.

In the present invention, the difference of the magnetic coupling power of the stator main poles and the stator supplementary poles against the rotor pole is adjusted by the change of pole width of each main and supplementary pole.

In the present invention, it is possible that the main poles and the supplementary poles are arranged adjoiningly and alternately.

In the present invention, it is also possible that the stator plates have a solid composition or a layer structure.

BRIEF DESCRIPTION OF THE DRAWINGS

The above mentioned and other features and objects of the present invention will become more apparent by reference to the following description taken in conjunction with the accompanying drawings, wherein like referenced numerals denote like elements, and in which.

DETAILED DESCRIPTION OF THE INVENTION

Figure 2:
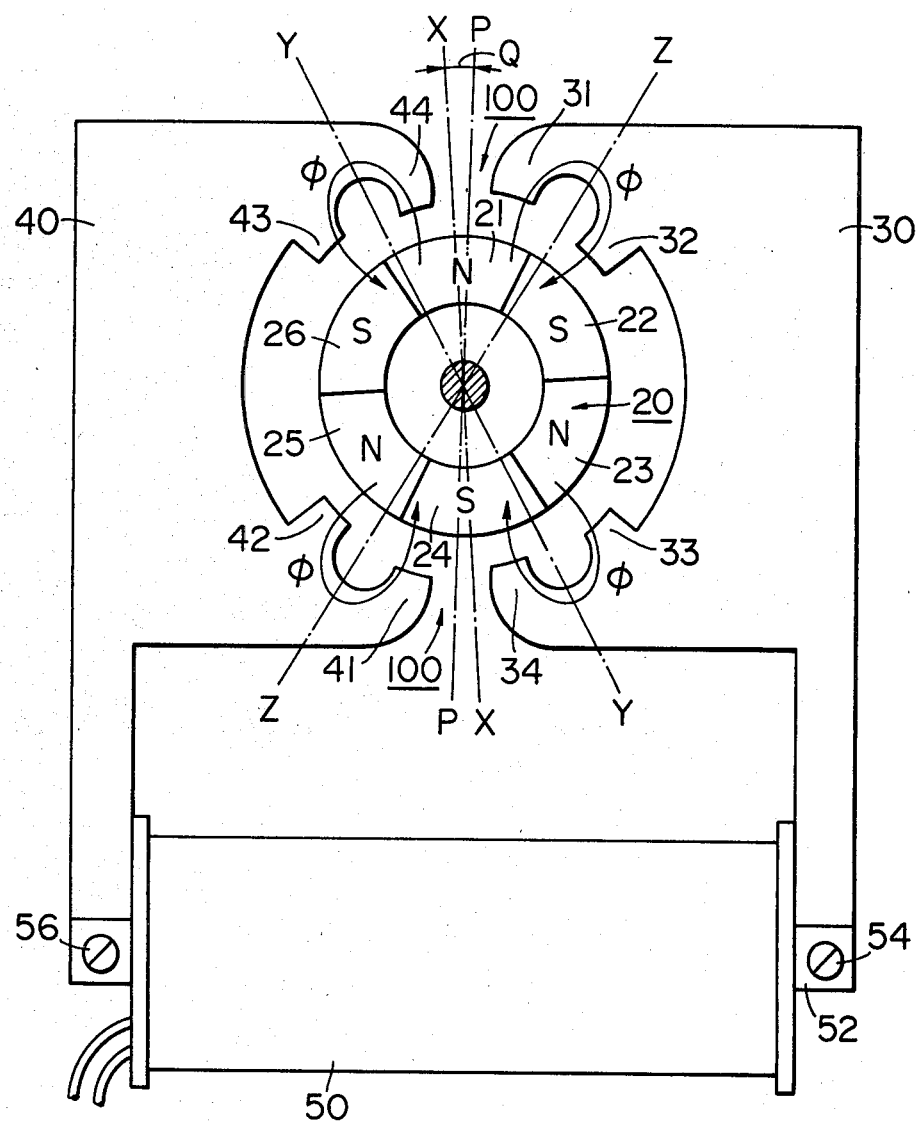
FIG. 2 is a top view of a principle portion of six pole-rotor and eight pole-rotor showing a preferred embodiment of a synchronous motor for timepiece in accordance with the teachings of the present invention.

In FIG. 2 is shown the first preferred embodiment of a synchronous motor for a timepiece in accordance with the teachings of the present invention, and it is understood that, in this embodiment, a rotor 20 has six magnetized rotor poles 21, 22, 23, 24, 25 and 26 around its circumference, and n, a positive integer of the rotor pole numbers which are determined by a formula of $2(2n+1)$ is set at 1. Accordingly, each rotor pole is oppositely arranged so that it can be a different pole across from each other against the center of the rotor. In another words, in the opposite position against the center of rotor poles 21, 23 and 25 forming the N poles are arranged rotor poles 24, 26 and 22 forming the S poles, and each of six rotor poles has a pitch angle of 60 degrees respectively.

On the other hand, in the vicinity of the rotor 20, eight stator poles are separately arranged with an air gap and are formed on a pair of stator plates 30 and 40. The stator plates 30 and 40 have a total of eight stator poles 31, 32, 33, 34 and 41, 42, 43, 44, and n of the stator pole numbers, which are determined by a formula of $2(2n+1)+2$ is set at 1 in accordance with the teachings of the present invention. In the present invention, the stator poles of the respective stator plates 30 and 40 are arranged at non-equal angles over certain portions. In the illustrated embodiment, the respective pitch angles of stator poles 31 and 32, 33 and 34, 41 and 42, and 43 and 44 are set at 0.5 times rotor pole pitch angle, that is, 30 degrees, whereas the rotor poles 32 and 33, and 42 and 43 are arranged at the pitch angle of 90 degrees, which is set at 1.5 times the rotor pole pitch angle. Also in the illustrated embodiment, the stator poles 31 and 44, and 34 and 41 which adjacently face the stator air gap 100 lying inbetween the stator poles of both stator plates 30 and 40 are arranged at the pitch angle of 30 degrees, which is set at 0.5 times the rotor pole pitch angle.

The stator consisting of both stator plates 30 and 40 is magnetically coupled with an energizing coil 50. In other words, both stator plates 30 and 40 are fixed to a core 52 of the energizing coil 50 by screws 54 and 56. In the present invention, it is possible to use connecting means other than screws such as clasped fastening, etc. for fixing the stator plates 30 and 40 to the core 52.

Figure 3:
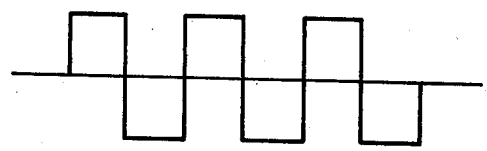
FIG. 3 is a wave form chart showing an example of input alternating electric signal to an energizing coil of the motor in accordance with the teachings of the present invention.

As shown in FIG. 3, the alternating electric signal such as a rectangular wave supplied from a crystal oscillator or the like, or a sinusoidal wave obtained from an AC commercial power source are provided to the energizing coil 50 to supply alternating magnetic flux corresponding to the alternating electric signal frequency to the stator plates 30 and 40.

In the illustrated embodiment, the rotor pole numbers are set at six and a total of the stator pole numbers is set at eight. Each pitch angle of stator poles is set at 0.5 or 1.5 times the rotor pole pitch angle, and the stator poles are formed with main poles and supplementary poles having different air gaps to the rotor poles. In another words, the stator poles 32 and 34 of the stator plate 30 and the stator poles 42 and 44 of the stator plate 40 form the stator main poles, whereas the stator poles 31 and 33 of the stator plate 30 and stator poles 41 and 43 of the stator plate 40 form the stator supplementary poles having wider air gap to the rotor poles than the above mentioned main poles. Accordingly, in the illustrated embodiment, formed therein are two main pole pairs 32–42 and 34–44, and two supplementary pole pairs 31–41 and 33–43 through the center of the rotor 20.

It is understood that in each of the stator plates 30 and 40 in the illustrated embodiment the main poles are always arranged in the clockwise forward position from the supplementary poles. It is preferable that the air gap ratio between the main pole and the supplementary pole to the rotor poles be set at a range bigger than 1 and smaller than 1.4.

Figure 4:
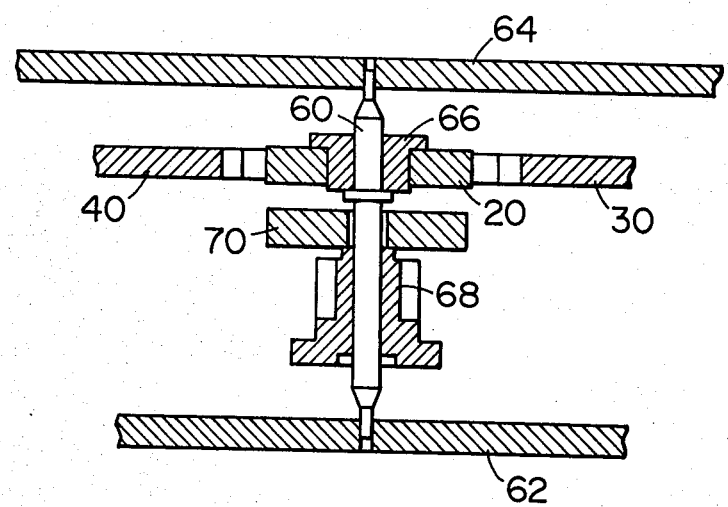
FIG. 4 is a section view of a principle portion showing a supporting composition of the rotor in the embodiment of FIG. 2.

In FIG. 4, shown therein is a supporting composition of the rotor and the stator in FIG. 2. A rotor shaft 60 is rotatingly held by a main plate 62 and a supporting plate 64, and the rotor 20 is fixed to a rotor pole holder 66 which is fixed to the rotor shaft 60. To the rotor shaft 60 is fixed a rotor pinion 68, which is geared to the well-known time indicating gear train, and rotation of the rotor 20 is transmitted to the time indicating hands through the time indicating gear train. Furthermore, to the rotor shaft 60 is loosely attached a damper plate 70 to absorb external shock and vibrators against the rotor 20 and to reduce the change of rotating speed of the rotor 20. At the side of the rotor 20 are arranged the stator plate 30 and 40. In the illustrated embodiment, the stator plates 30 and 40 are formed by a solid plate made from permalloy etc. including 70 percent nickel, but it is possible to make the stator plates from layered permalloy or thin electro-magnetic soft iron plates.

In operation, the dynamic magnetic center lines of the stator in the embodiment is shown as Y and Z. In the present invention, the dynamic magnetic center lines are the electro-magnetic power activity center lines between the stator and the rotor when the alternating electric signal is supplied to the energizing coil and the alternating magnetic flux is generated, and are defined for the magnetic power activity center lines adjacent to the stator air gap of adjoining stator plates 30 and 40. In the illustrated embodiment, when the rotor plate 30 becomes S pole and the stator plate 40 becomes N pole, the N pole 21 of the rotor 20 continues to be magnetically attracted at the facing position across from the stator main pole 32 and the stator supplementary pole 31, whereas the N pole 21 continues to be magnetically attracted at the facing position across from the stator main pole 44 and the stator supplementary pole 43 in case the energizing coil 50 is conversely excited. As evident from the above, it is understood that the dynamic magnetic center lines are shown as Y and Z in FIG. 2. The dynamic magnetic center lines becomes geometric center positions of the main pole 44 and the supplementary pole 43, and the main pole 32 and the supplementary pole 31 respectively, but the dynamic magnetic center lines Y and Z are positioned slightly clockwise from the geometric center lines of the main poles and the supplementary poles in the illustrated embodiment, since the air gaps of the supplementary poles 31 and 43 against the rotor 20 are set slightly bigger than the ones of the main poles 32 and 34.

As described in the above are determined the dynamic magnetic center lines in the embodiment, and a static center position of the rotor 20 is described in the following.

In FIG. 2 is shown a state where the alternating electric signal to the energizing coil 50 is not supplied, or a state where the rotor 20 stays in the static stable position. The center line of the rotor pole across the stator air gap 100 at this time is determined as the static central position of the rotor. As evident from the arrangement of the rotor poles and the stator poles described in the above, the magnetic flux illustrated by arrow φ flows through the stator poles, and, in such state, the static stable position of the rotor is obtained. The static central position of the rotor connecting the center line of the rotor N pole 21 and the rotor S pole 24, therefore, is shown by X. The static center position X is slightly deflected counter-clockwise from the center line of the stator air gap 100 which results in the different magnetic coupling powers for the stator main poles and the stator supplementary poles to the rotor in this embodiment. In this embodiment, the arrangement that the main poles are always positioned clockwise from the supplementary poles generates an off-set angle described in the above.

The static central position X of the rotor 20 is obtained as mentioned in the above, and the geometric center line P of the above mentioned dynamic magnetic center lines Y and Z almost coincide with this static central position X, although the different magnetic coupling power between the rotor and the stator main poles and supplementary poles generates the off-set angle Q. In other words, the static central position X is almost positioned in the center of the dynamic magnetic center lines Y and Z so that the unbalanced self-starting driving power to clockwise or counter-clockwise at the time of self-starting oscillation is almost zero.

Furthermore, the static central position of the rotor poles in the static state of the rotor, when the alternating electric signal is not supplied to the energizing coil 50, is described in details in the following.

As afore-mentioned, the magnetic flux shown by the arrow φ flows through the stator poles from the rotor poles. The magnetic flux from the rotor N pole 21, for example, reaches the adjacent rotor S pole 22 through a magnetic path with the smallest magnetic resistance consisting of the stator supplementary pole 31 and stator main pole 32 of the stator plate 30. In the same manner, the magnetic flux from the rotor N pole 23 reaches the rotor S pole 24 through the magnetic path consisting of the supplementary pole 33 and the main pole 34, from the rotor N pole 25 reaches the rotor S pole 24 through the magnetic path consisting of the main pole 42 and the supplementary pole 41, and from the rotor N pole 21 reaches the rotor S pole 26 through the magnetic path consisting of the main pole 44 and the supplementary pole 43. As mentioned in the above, in the static state of the rotor, the rotor pole magnetic flux flows through the magnetic paths with the smallest magnetic resistance and the static stable state in FIG. 2 is obtained. Therefore, it is understood that in this state the adjoining rotor N and S poles take a position facing the adjoining stator main poles and supplementary poles. In this case, the position is that one rotor pole, N pole 21 for example, faces the adjoining stator supplementary pole 31 and supplementary pole 32. Furthermore, the magnetic flux of the rotor N pole 21 reaches the rotor S pole 22, the rotor pole 22 for example, through a magnetic path with a large magnetic resistance consisting of the stator plates 30 and 40. The magnetic resistance in this case becomes remarkably larger than the one in the above mentioned FIG. 2, and the rotor does not take such static position, but the static position of FIG. 2 is obtained without fail in the static state.

In the above static state of the rotor in FIG. 2, when the alternating electric signal is supplied to the energizing coil 50, the stator plates 30 and 40 are excited to be N and S poles alternately. When the stator plate 30 is excited to be a S pole, the rotor 20 begins to rotate clockwise and, when the stator pole 30 is excited to be a N pole, the rotor 20 starts to swing counter-clockwise. An immediate self-start synchronized rotation can be induced since the static central position X of the rotor 20 is nearly positioned in the center of the dynamic magnetic center lines Y and Z, and the driving power in such case receives a balanced driving power to both directions. Accordingly, since the self-starting in the present invention is not affected by the loss caused in the unbalanced state of the driving power at the static central position X, a comparatively rapid self-starting action is obtained to enter into immediate synchronized constant speed rotation.

Furthermore, in the illustrated embodiment, the different magnetic coupling power of the stator main pole and supplementary pole to the rotor provides the slight difference in the effective driving power at the time of self-starting, and can set the self-starting rotation in a specific direction. In another words, there is the off-set angle Q between the static central position X of the rotor 20 and the center line P of the dynamic magnetic center lines of Y and Z of the stator and the start from this static position produces some difference of the effective driving power. In FIG. 2, when the stator plate 30 is excited to be an S pole, the rotor N pole 21 is driven clockwise. In other words, an attractive driving power to the rotor produced between the stator main pole 32 and supplementary pole 31 and the rotor pole 21, when the rotor rotates to swing at 30 degrees, is provided clockwise, since the dynamic magnetic center line Z of the stator exists towards driving side (clockwise) from the center position of the rotor pole 21. On the other hand, when the stator plate 40 is excited to be an S pole, the rotor N pole 21 is driven counter-clockwise. In other words, the attractive driving power to the rotor produced between the stator main pole 44 and supplementary pole 43 and the rotor pole 21, when the rotor rotates to swing at 30 degrees, is provided as a reducing power against the clockwise driving, since the dynamic magnetic center line Y of the stator exists at anti-driving sides (clockwise) from the center position of the rotor pole 21. Accordingly, a large clockwise effective driving power is always provided to the rotor so that the self-start rotating direction is set in a specific direction when entering into the synchronized constant speed rotation. In the illustrated embodiment, the rotor 20 produces the clockwise synchronous constant speed rotation in almost all cases and a specific rotating direction can be obtained. In the present invention, it is possible to separately install the well-known reverse rotation preventive instrument so that the rotating direction of the rotor 20 is more firmly determined.

The rotation of the time of self-starting of the rotor 20 can be regarded as parametric driving oscillation and the equation of motion on the initial feeble oscillation of the rotor 20 right after the alternating input signal is excited to the energizing coil 50, is formularized as follows:

$$Ja \frac{d^2\theta}{dt^2} + \gamma \frac{d\theta}{dt} + \left(2PTs + \frac{\sqrt{2}}{2} KImcos\omega t\right)\theta = -\frac{\sqrt{2}}{2} KImsin\omega t$$

Ja: Moment of Inertia of Rotor Shaft
γ: Hydraulic Resistance
P: Rotor Pole Logarithm
Ts: Preserving Torque (Static Torque Working at Rotor without Input Power)
K: Electrokinetic Coupling Factor
Im: Standard Wave Component of Electric Current
ω: Angular Frequency of Power Source
θ: Rotating Angle of Rotor Accordingly, the suitable selection of the parameter of the above equation of motion makes rotating angle θ of the rotor 20 grow as the time elapses, and the rotor enters into the synchronized constant speed rotation when this rotating angle θ exceeds the angle of 30 degrees in this embodiment.

As evident from the above-described, the present invention eliminates the unbalance of driving power towards the rotating direction at the time of self-starting of the rotor 20 since the static central position X of the rotor 20 is arranged near the center of the dynamic magnetic center lines Y and Z of the stators, and provides extremely rapid self-starting properties since the electro-magnetic power between the stators and the rotor is efficiently utilized for the increase in the rotational speed. The rotor 20 of the present invention has at least six rotor poles, and the rotation angle until the synchronized constant rotational speed is achieved can be extremely small in comparison with the prior device since the stator poles are selected in accordance with the above description. The rotation angle also becomes 30 degrees in the six rotor poles of FIG. 2 and can be reduced by one third compared to 90 degrees in the prior art device, which makes it possible to perform rapid self-starting. As in the illustrated embodiment, the static central position X does not always coincide with the center line P of the dynamic magnetic center lines Y and Z of the stators since the stator pole consists of of main poles and supplementary poles, and has some off-set angle Q. The equal magnetic coupling power of the main poles and the supplementary poles to the rotor, however, could completely coincide X with P (overlapped on the center position of stator air gap 100), and could eliminate the unbalance of driving power at the time of starting. In the embodiment of FIG. 2, the number of rotor poles are selected as six and the total number of stator poles are selected as eight, but by means of arbitrary determination of n the total number of stator poles can be selected as 12 against the number of rotor poles number of ten, and the total number of stator poles can be selected as 16 against the number of rotor poles number of 14. The number of rotor poles decided by 2(2n+1) can provide such magnetic pole arrangement that N and S poles are facing across from each other against the center point of the rotor, and extremely preferable processing performance is obtained for the magnetizing operation of the rotor by such magnetic pole arrangement. As a deformed embodiment of the present invention, it is possible for the numbers of the rotor poles and the stator poles to be selected into the other arbitrary pole numbers regardless of the above mentioned formula 2(2n+1) or 2(2n+1)+2.

In the present invention, the synchronized speed of the rotor can be settled low whereas the synchronized torque is selected large since the number of rotor poles and the number of stator poles are settled extremely large compared to the prior art device. As a result, the wear on the bearing of the rotor can be minimized and a synchronous motor having good oil retaining ability and small rotating noise can be obtained.

As the embodiment shown in FIG. 2, the formation of the stator by the main poles and the supplementary poles having different magnetic coupling power with the rotor provides a specific directional force to the rotating direction of the rotor 20, and provides a synchronous motor extremely preferable as a device in which one directional rotation is essential in a timepiece. In the embodiment, the difference in the magnetic coupling power between the main pole and the supplementary pole is obtained by the difference in the air gap with the rotor, and also the same effect can be obtained by setting the pole width of the main pole wider than the width of the supplementary pole.

As described heretofore, the synchronous motor for timepiece in the present invention can accomplish the improvement of the motor efficiency at the time of synchronized constant speed rotation as well as obtain the above described preferable self-starting performance since the rotor pole numbers and the stator pole numbers are set in a certain relation and the arrangement of stator poles are set in non-equal distances.

Figure 1:
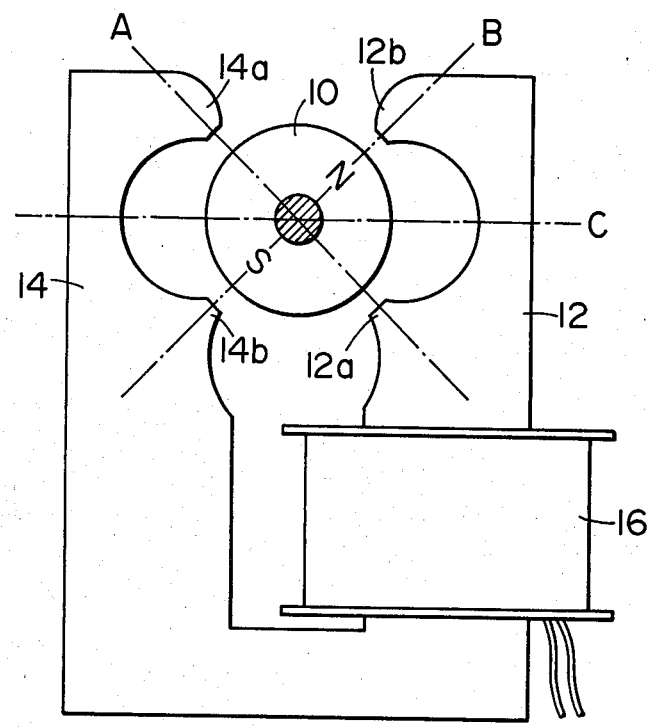
FIG. 1 is a top view showing a principle portion of a conventional synchronous motor for timepiece.
Figure 5:
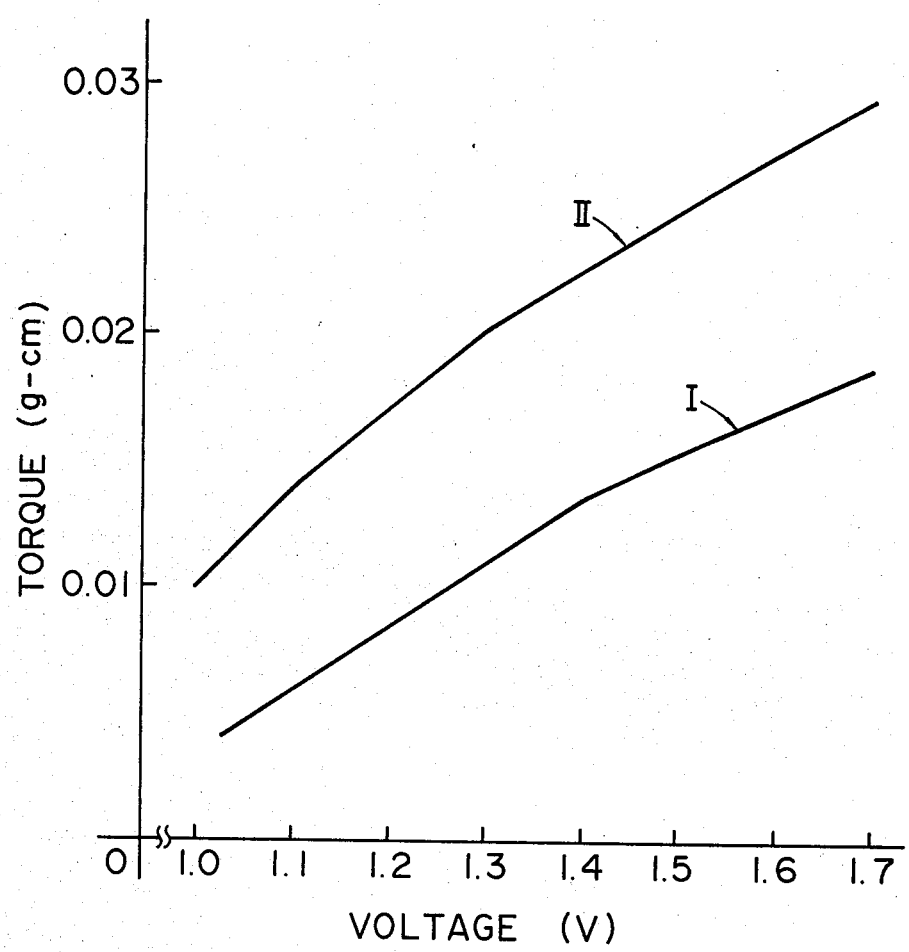
FIG. 5 is a graphical representation showing the comparative voltage torque characteristics between the motor of the prior art (I) and the motor in accordance with the teachings of the present invention (II)

In FIG. 5, shown therein is voltage torque characteristics regarding the present invention and the prior art device. Voltage (V) is shown in the horizontal axis and torque (g-cm) is shown in the vertical axis. Also the characteristic curve (I) represents the prior art motor and the characteristic curve (II) represents the motor in accordance with the present invention. As the characteristics of the conventional motor, the driving frequency is 8 Hz., and the alternating electric signal with a duty factor of 50 percent drives a device shown in FIG. 1. The rotating speed of the rotor at this time is indicated 480 r.p.m. In the same manner, in the motor in accordance with the present invention, the driving frequency is 16 Hz., and the alternating electric signal with a duty factor of 50 percent drives the motor shown in FIG. 2. The speed of the rotor at this time is indicated 320 r.p.m.

Figure 6:
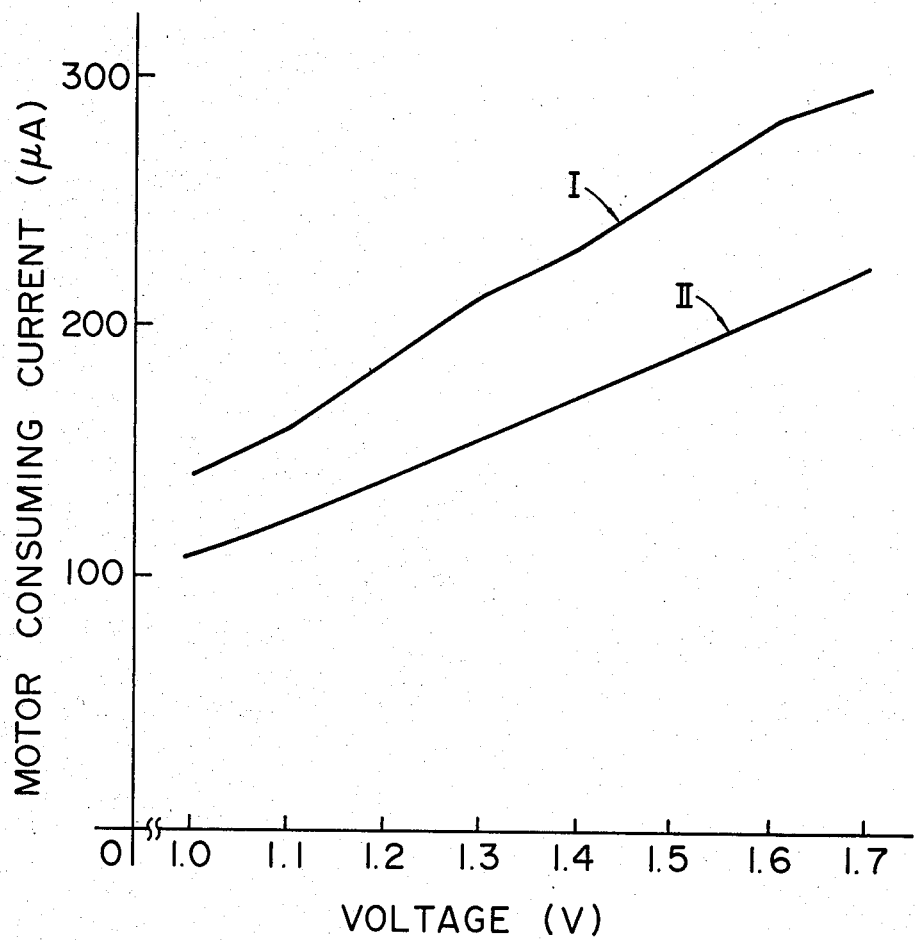
FIG. 6 is a graphical representation showing the comperative voltage and current consumption characteristics between the motor of the prior art (I) and the motor in accordance with the teachings of the present inventon (II).

In FIG. 6, shown therein is voltage and current consumption characteristics. Voltage (V) is shown in the horizontal axis and current consumption ($\mu$A) is shown in the vertical axis. The driving conditions of each motor is same with the conditions shown in FIG. 5.

The motor efficiencies of the conventional motor and the motor in accordance with the present invention can be calculated as follows through the characteristics shown in FIG. 5 and FIG. 6.

The power source voltage is supplied by a 1.5 V battery, and the efficiency of the prior art motor (I) is obtained as 12.30% from the torque 0.0158 g-cm, and the electric current consumption 280 $\mu$A at this time.

On the other hand, the efficiency of the motor (II) in accordance with the present invention is obtained as 23.70% from the torque 0.0254 g-cm, and the electric current consumption 235 $\mu$A.

Accordingly, it is evident that the motor in accordance with the present invention is improved by more than ten percent in comparison with the conventional motor.

In addition to this, even if any supplementary pole is replaced by a main pole, the remainder of supplementary poles can provide the same self-starting directional performance if the total members of stator poles are composed of such numbers as 12, 16 or 20, although the stator main poles and the stator supplementary poles are set at the same numbers respectively in the illustrated embodiment.

As described heretofore in the embodiment, the present invention provides preferable self-starting properties and the synchronous motor for timepiece having an excellent motor efficiency, which is preferable for an analog type display timepiece with low electric power consumption. Placement of the main poles and the supplementary poles on the stator pole can restrict the starting direction for a specific direction, and the present invention can provide a device having a wide range of utilization field.

In all cases it is understood that the above described embodiment is merely ilustrative of but a few of the many possible specific embodiments which represent the applications of the principles of the present invention. Numerous and varied other arrangements can be readily devised in accordance with these principles by those skilled in the art without departing from the spirit and scope of the invention.

We claim:

1. A synchronous motor for a timepiece having:
    a rotor having a plurality of magnetized rotor poles about its circumference;
    a stator having a plurality of stator poles arranged around the vicinity of said rotor separated by an air gap; and
    an energizing coil supplying alternating magnetic flux to said stator;
    wherein the improvement comprises:
    at least the number of rotor poles of said rotor is 6 and the number of stator poles is 8;
    said stator poles comprise alternately arranged main and supplementary poles, said main poles being provided in a clockwise forward position from said supplementary poles;
    air gap between said stator supplementary poles and said rotor is wider than an air gap between said stator main poles and said rotor such that the magnetic coupling power of the supplementary poles with the rotor poles is always less than the coupling power of the main poles with the rotor poles so that the direction of self-starting rotation can be restricted to a specific direction;
    a static central position of said rotor is substantially at a center of dynamic magnetic center lines of said stator to eliminate imbalance existing in self-starting driving power with regard to direction of rotation at the time of self-starting; and
    a pitch angle of adjoining said stator poles is 0.5 or 1.5 times a pitch angle of said rotor poles and said pitch angle of said adjoining stator poles is 30° or 90°.

2. A synchronous motor for a timepiece according to claim 1, wherein said air gap between said stator supplementary poles and said rotor is greater than 1 but less than 1.4 times the air gap between the stator main poles and said rotor.

3. A synchronous motor for a timepiece according to claim 1, wherein said stator supplementary poles are narrower than said stator main poles.

4. A synchronous motor for a timepiece according to claim 1, wherein said stator plate consists of a layered structure.

* * * * *